Figures 1, 4, 5:
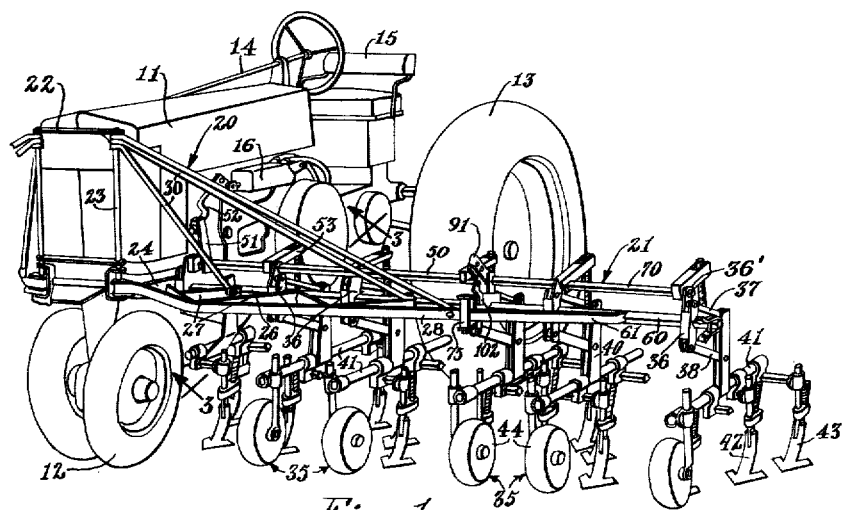

June 4, 1963

G. D. HUNTER ETAL 3,092,187

FARM IMPLEMENT

Filed April 21, 1958

2 Sheets-Sheet 1

INVENTORS
G. D. Hunter & D. A. Hill

BY
C. F. Parker and W. A. Murray
Attorneys

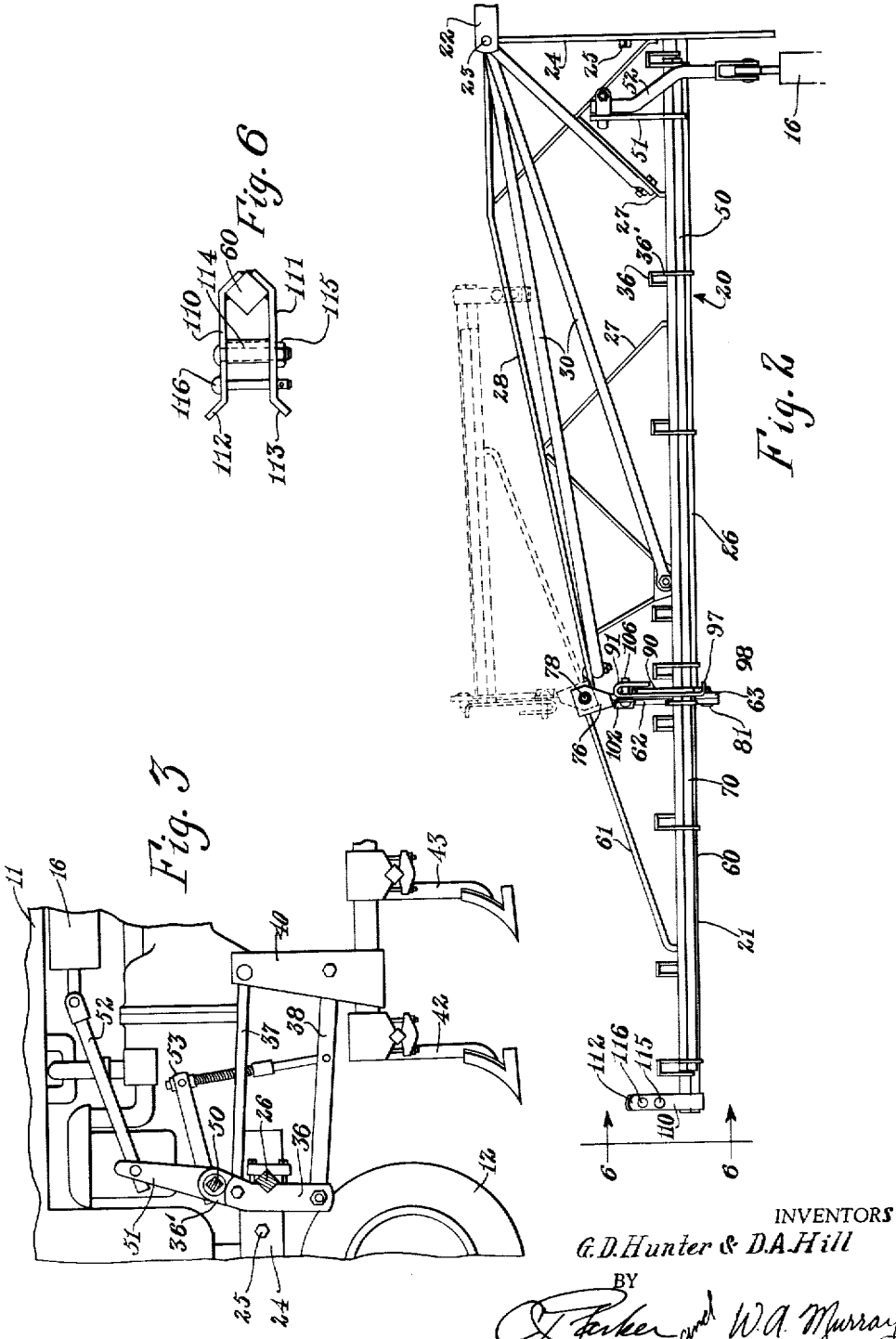

United States Patent Office 3,092,187
Patented June 4, 1963

3,092,187
FARM IMPLEMENT
George D. Hunter and Donald A. Hill, Des Moines, Iowa, assignors, by mesne assignments, to Deere & Company, a corporation of Delaware
Filed Apr. 21, 1958, Ser. No. 730,018
11 Claims. (Cl. 172—297)

This invention relates to a farm implement and more particularly to a tractor-mounted farm implement which is connectible to and extends outwardly from the side of a tractor and forwardly of the rear wheels of the tractor.

Typical of present day implements of this type is a tractor-mounted cultivator shown in U.S. Patent 2,423,148 issued to T. W. Johnson. In this type of cultivator there is normally provided vertical pivot means at the forward end of the tractor body. Structures carrying the left and right hand sections of the cultivator are connected to the pivot means and extend rearwardly and outwardly from the pivot means to opposite sides of the tractor body. There is provided additional means on the side of the tractor body for connecting the cultivator in a fixed position relative to the tractor. The purpose or advantage of this type of cultivator is the favorable disposition of the loads created by the cultivator on the tractor body as well as the advantage of having the cultivator shovels positioned forwardly of the operator where the operation may be viewed quite easily. There are provided implement tools or cultivator shovel assemblies which operate to cultivate either two or four rows of corn. In this type of cultivator, the overall width of the assembly is not relatively large and the assembly of tractor and cultivator may easily and legally move down the highway or through a fence gate of normal width.

More recently, there has been contemplated the use of a six-row or even larger cultivator with provision for cultivating equipment for three or more crop rows being on opposite sides of the tractor. This obviously has created a problem of the manner of mounting the cultivator on the tractor so that upon its moving through gates or while transporting the implement on a highway, the overall width of the tractor and cultivator assembly will be both within legal as well as the practical limits.

With the above in mind, it is the main object of the present invention to provide a tractor-mounted implement or cultivator in which there is provided an inner section adjacent to the forward side of the tractor and an outrigger section adjacent the outer end of the inner section which operates generally as an outer continuation of the inner section. The outrigger section will be connected to the outer end of the inner section by means of a vertically disposed pivot which will permit the outrigger section to swing forwardly so as to be positionable forwardly of the inner section for the purpose of narrowing the overall width of the assembly. The pivot, while disposed generally vertically, will be inclined from its lower end rearwardly so as to cause the outrigger section in its swing forwardly to also rise, thereby compensating for the natural tendency of the outrigger section to dip as it is swung forwardly and also to permit the tools on the outrigger section to be slightly raised when in its forward position so as to avoid their contact with the ground or road as the tractor moves over uneven portions of the ground or road.

In the type of cultivator here contemplated, there are provided transverse rockshafts on the cultivator sections which are operated from the power-lift system on the tractor and which are utilized to raise or lower the cultivator tools. It is also contemplated that the transversely aligned rockshafts will be detachably connected at their adjacent ends so as to operate in unison in raising and lowering the cultivator shovels. Also, provision is made to permit the rockshafts on the outrigger sections to be locked in a fixed position, so that the cultivator shovels may be raised and held in a raised position when the outrigger sections are swung forwardly.

It is therefore a further object of this invention to provide means for connecting the rockshafts on the inner and outrigger sections which are so connected to give the above features.

Other objects and advantages of the present invention will become apparent to those skilled in the art as the nature of the invention is better understood from the following description and as shown in the accompanying drawings.

FIG. 1 is a front and left side perspective of the left cultivator rig and a tractor.
FIG. 2 is a plan view of the left cultivator rig.
FIG. 3 is a partial sectional view of the cultivator and its associated lift mechanism.
FIG. 4 is an enlarged plan view of the attaching mechanism between the adjacent ends of the rockshafts for adjusting the cultivator shovels on the inner and outrigger sections.
FIG. 5 is a sectional view taken substantially along the line 5—5 of FIG. 4.
FIG. 6 is an end view of the connecting structure between the outrigger section and the inner sections and taken substantially along the line 6—6 of FIG. 2.

The tractor herein shown is of the tricycle type, having a fore-and-aft elongated body 11 supported at its forward end by a grille assembly, indicated in its entirety by the reference numeral 12, and at its rear by a pair of transversely spaced apart rear traction wheels, the left traction wheel being shown at 13. A conventional steering column 14 is operated from an operator's station 15. The tractor has its own hydraulic power system which includes a hydraulic cylinder 16. A similar cylinder operates on the right side of the tractor for operating the right cultivator, not shown. The cultivator or implement on the left side of the tractor is composed of an inner section, referred to in its entirety by the reference numeral 20 and an outrigger section indicated in its entirety by the reference numeral 21. The inner section 20 and its method of mounting on the tractor is substantially identical to that shown and described in the aforesaid Johnson patent. Consequently, the description will be only general and only sufficient for a full appreciation and understanding of the present invention. The inner section 20 is mounted on the tractor by means of a front mounting structure 22 which is bolted to the forward end of the tractor body 11. The structure 22 includes therein a vertical shaft 23 which serves as a vertical pivot on which the inner section 20 may swing. Mounted on the vertical shaft 23 is a laterally swingable frame member 24 which will normally lie adjacent to the side of the tractor and which may be bolted, as at 25, to the tractor. Fixed to and extending outwardly from the frame member 24 is a transversely disposed and horizontal tool bar 26. The tool bar 26 serves as a portion of a laterally disposed frame composed of a series of forwardly extending and diagonal braces, such as at 27, which are fixed to a forward frame member 28 which in turn is also pivotally mounted on the vertical shaft 23. Therefore, as may be seen from viewing the figures, the entire inner cultivator section may be swung laterally about the forward pivot or shaft 23. As is clearly discussed in the aforesaid Johnson patent, the purpose of the laterally swinging section 20 is for mounting and dismounting the cultivator on and off of the tractor. Also provided for support of the inner section 20 are trusses such as at 30 for bracing the section vertically.

A series of cultivator tool assemblies 35 are mounted on the tool bar 26. It should be understood that cultivator tools are here shown and described only for purposes of illustration and it is not meant to restrict or limit the present invention to cultivator tools but to include all other types of tools and implements capable of being carried on a frame similar to the one herein described. The assemblies 35 include an upright clamp 36 which is connected directly to the tool bar 26 and which has upper and lower ends which interconnect a pair of rearwardly extending parallel links 37, 38. The rear ends of the links 37, 38 support an upright structural member 40 the lower end of which supports a fore-and-aft extending pipe 41 on which are mounted front and rear cultivator devices 42, 43. At the forward end of the pipes 41 is a gauge wheel 44. Due to the location of the inner cultivator assembly relative to the front wheels 12, there is no gauge wheel and the pipe supporting the shovel standards 42, 43 is shortened in order to avoid interference with the front wheels 12 (such being shown in FIG. 3).

On the clamp members 36 are upwardly extending bracket portions 36' in which are journaled a transverse and horizontally disposed rockshaft 50. Mounted on the inner end of the rockshaft 50 is a lever arm 51 having a link 52 interconnecting its upper end directly to the ram of the remote cylinder 16. Fixed to and extending rearwardly from the rockshaft 50 is a linkage 53 which is connected to the lower link 38 of the parallel linkage and operates upon the rocking of the rockshaft 50 to raise or lower the cultivator assemblies 35.

The outrigger section 21 includes a laterally extending and triangular shaped frame composed of a tool bar 60 which is normally mounted on the cultivator so as to serve as a continuation of the tool bar 26 and a diagonally and forwardly extending structural member 61. A fore-and-aft extending side plate or member 62 connects the inner ends of the diagonal member 61 and the tool bar 60. The plate 62 normally lies adjacent to a fore-and-aft extending plate member 63 which interconnects the forward diagonal brace 28 and tool bar 26 of the inner cultivator section 20. A series of transversely spaced cultivator rigs, similar to those previously described and consequently having the same reference numbers, is mounted on the transverse tool bar 60 of the outer cultivator section. Also mounted on the tool bar 60, in a manner similar to that previously described relative to the rockshaft 50 and its associated inner cultivator section, is a rockshaft 70 which is in transverse alignment with and has its inner end adjacent the outer end of the rockshaft 50.

The member 63 is formed at its forward end into an upright column 75 which is hollow to form an upright pivot which is inclined slightly rearwardly from its lower end. A pair of metal pads 76, 77 is fixed to the upper and lower edges of the end plate 62 and extend inwardly adjacent the upper and lower edges of the end plate 63. The pads 76, 77 support a pivot pin 78 which extends through the pads 76, 77 and through the hollow portion of the columnar portion 75 of the plate 63. The pin 78 is held in a relatively fixed but pivotal position by pins 79, 80 respectively. As may be seen in FIGS. 4 and 5, the pivot pin 78 and columnar portion 75 operate as a forward pivotal connection which permits the outrigger section 21 to swing laterally forwardly. Since the pin 78 and columnar member 75 are inclined to the horizontal, the outrigger section when swinging forwardly, will also tend to rise. As the outrigger section 21 reaches a position in which the tool bar 60 and rockshaft 70 are fore-and-aft, gravity will tend to drive the outrigger section into its transport or forward position and will also tend to hold the section in that position although, as will later be explained, other lock means are provided to prevent the section from swinging forwardly. The degree of rise is sufficient to overcome the natural fall which the outrigger section 21 would have due to the effect of its weight upon the joints in the connection and to also maintain the tools on the outrigger section slightly higher than those on the inner section so as to avoid contact of the tools with the ground should the tractor move over uneven ground or road. Provided at the rear of the plates 62, 63 are suitable apertures for receiving bolt and nut means 81 which hold the outrigger section in a fixed position relative to the inner section 20 when the cultivator is in normal operation.

Fixed to the rockshaft members 50, 70 is a pair of rockarms 90, 91 respectively. The forward end of the rockarm 91 is curved in a U-shape and has a rearwardly extending portion 92 positioned to extend on the inner side of the rockarm 90. The rockarm 90 and the rockarm 91 and the rearwardly extending portion 92 of the rockarm 91 are provided with apertures 93, 94, 95 which are registrable transversely to receive a pin or fastener which will lock the two rockarms 90, 91 to cause the rockshafts 50, 70 to move in unison. The rear end of the rockarm 91 has an inwardly extending lug 97 which will fit above and will normally intercept the rear end of the rockshaft 90, which has an abutting edge 98 for contacting the lower edge of the lug 97. Also, fixed to the lower edge of the rockarm 91 is an inwardly extending extension or pad 100 which engages the lower edge of the rockarm 90 upon relative downward movement of the arm 91. Welding, as at 101, fixes the pad 100 to the lower edge of the rockarm member 91. Fixed to the outer surface of the end plate 62 is an upwardly extending bracket or lock member 102, the inner surface of which lies adjacent to the rockarm 91. The rockarm 91 is provided with a pair of transversely aligned apertures 103, 104, and the bracket 102 is provided with an arcuate slot 105. The apertures 103, 104, and the slot 105 are registrable with one another so as to receive a transverse pin or fastener 106. As will later become apparent, the pin 106 may also be used to lock the two rockarms 90, 91 together by inserting it in the apertures 93, 94, and 95.

The cultivator or implement operates in the following manner. Assuming the inner section is fixed in a conventional manner to the side of the tractor, and the outrigger section is positioned in operational position so that the tool bars 26, 60 and rockshafts 50, 70 are in transverse alinement, and the bolts 81 are positioned to lock the outer section 21 against swinging about its forward pivotal connection, the outrigger section 21 may be permitted to swing forwardly so as to permit the tractor and implement assembly to pass through a gate or to travel along a highway in a manner as follows. The hydraulic cylinder 16 is operated to drive the lever 51 forwardly to rotate the rockshaft 50 in a counterclockwise direction and to raise the cultivator tool assemblies 35. In this position the pin 106 will have been inserted in the apertures 93, 94, 95 so that the two rockarms 90, 91 operate in unison. Raising of the implements will cause the rockarm 90 to abut against the pad or stop 100 at its forward end and against lug 97 at its rearward end. The pad 100 and lug 97 may then be treated as one-way drive means raising the tool assemblies. In this position the pin 106 may be removed and inserted in the apertures 103, 104 and the slot 105, thus releasing the rockarms 90, 91 for relative movement. Also, by positioning the pin 106 in the slots 103, 104 and the slot 105 the implements on the outrigger section are locked in their up position. Thus, the bracket 102 and associated slot 105 may be treated as lock means for maintaining the tools in the up position.

The hydraulic cylinder 16 is then operated to lower the implements on the inner section so that the forward end of the rockarm 90 moves upwardly to a position in which it clears the rear edge of the rearwardly extending portion 92 of the rockarm 91. Upon removing the bolts 81, the outrigger section 21 is free to swing forwardly about the forward pivot pin 78 to a position indicated in dotted representation in FIG. 2.

On the outer end of the tool bar 60 is provided means for locking the outrigger section 21 in its forward position and against swinging on the pin 78. Upper and lower brackets 110, 111 respectively are fixed to and extend forwardly from the tool bar 60. The forward ends of the brackets 110, 111 are flanged upwardly and downwardly respectively as at 112, 113. Provided forwardly of the tool bar 60 is a vertically disposed spacer 114 mounted between the brackets 110, 111 by means of a bolt and nut combination 115. Positioned forwardly and spaced from the spacer 114 is a removable pin 116. In locking the outrigger section 21 in its forward position, the pin 116 is removed to permit the forward diagonal brace 28 of the inner section to be positioned between the brackets 110, 111 and adjacent the spacer 114. The pin 116 is then placed in position so as to lock the brace 28 between the pin 116 and the spacer 114.

In moving the outrigger section into operational position, the pin 116 is removed to permit the section to swing outwardly and rearwardly about the forward pivot pin 78 into a position in which the bolt and nut combination 81 may be inserted through the apertures in the side plates 62, 63. The hydraulic cylinder is then operated to again raise the tools on the inner section whereby the rockarm 90 will be rotated to engage the stops 97. The pin 106 is then removed and inserted in the apertures 93, 94, and 95. At this point, the rockshaft 91 will be released for rocking motion and will be fixed to the rockarm 90 whereby the inner rockshaft 50 and outer rockshaft 70 will operate in unison.

By using a single pin or fastener 106 to lock the cultivator tools on the outer section in up position alternately with its use as a means connecting the rockarms 90, 91, the possibility of damaging the implement is avoided. In other words, there is no possibility of both locking the tools against movement while at the same time retaining connection to the power means for moving the tools. Thus, the lock means on the outrigger section for locking the tools against movement is in effect only to the exclusion of the means of connecting the rockarms 90, 91, and alternately the means of connecting the rockarms 90, 91 is in effect only to the exclusion of the lock means.

While only one form of the invention has been shown, it should be recognized that other forms and variations will occur to those skilled in the art. Therefore, while the present disclosure was set forth in detail for the purpose of clearly and concisely illustrating the principles of the invention, it is not the desire nor the wish to limit or narrow the invention beyond the broad general scope set forth in the appended claims.

What is claimed is:

1. A cultivator adapted for mounting on a tractor body comprising: an inner section and an outrigger section, the inner section being connected to the side of and extending outwardly from the tractor and having an outer side adjacent to an inner side of the outrigger section, each of the sections having laterally disposed frames including transverse implement carrying tool bars normally aligned with one another and transverse rockshafts supported on the frames also normally aligned with one another, the rockshafts being effective upon movement to adjust the implements vertically; structure forming a vertically disposed pivot inclined rearwardly from its lower end and mounted on the forward end of the outer side of the inner section; structure on the inner side of the outrigger section mounting the outrigger section on the pivot, said structures being complementary to one another to permit swinging of the outrigger section about said pivot from a first position in which the tool bars and rockshafts are generally in alignment upwardly and forwardly to a second position in which the outrigger section is transversely disposed relative to the tractor body and is forward of the inner section; a pair of rockarms mounted on the adjacent ends of the respective rockshafts; means for connecting said rockarms whereby the rockshafts will operate in unison; means for connecting the rockarm on the outrigger section to the outrigger frame whereby the implements on the outrigger tool bar may be held against vertical adjustment irrespective of movement of the implements on the inner section; attaching means for connecting the inner and outrigger sections to one another for preventing swinging of the outrigger section about the pivot; and means for rocking the rockshaft on the inner section.

2. A cultivator adapted for mounting on a tractor body comprising: an inner section and an outrigger section, the inner section being connected to the side of and extending outwardly from the tractor, the outrigger section being disposed outwardly of and adjacent the inner section, each of the sections having laterally disposed frames including transverse implement carrying tool bars normally aligned with one another; transverse rockshafts supported on the frames also normally aligned with one another, the rockshafts being effective upon movement to adjust the implements vertically; fore-and-aft extending vertically disposed plates adjacent to one another and fixed to the outrigger and inner sections respectively; structure at the forward end of one of said plates forming a vertically disposed pivot inclined rearwardly from its lower end; structure on the forward end of the other of said plates mounting the outrigger section on the pivot, said structures being complementary to one another to permit swinging of the outrigger section about said pivot from a first position in which thes tool bars and rockshafts are generally in alignment upwardly and forwardly to a second position in which the outrigger section is transversely disposed forwardly of the inner section; a pair of rockarms mounted on the adjacent ends of the respective rockshafts; means for connecting said rockarms whereby the rockshafts will operate in unison; means for connecting said rockarms whereby the rockshafts will operate in unison; means for connecting the rockarm on the outrigger section to the outrigger frame whereby the implements on the outrigger tool bar may be held against vertical adjustment irrespective of movement of the implements on the inner section; attaching means for connecting the inner and outrigger sections to one another for preventing swinging of the outrigger section about the pivot; and means for rocking the rockshaft on the inner section.

3. A cultivator adapted for mounting on a tractor body comprising: an inner section and an outrigger section, the inner section being connected to the side of and extending outwardly from the tractor, the outrigger section being disposed outwardly of and adjacent the inner section, each of the sections having laterally disposed implement carrying frames; transverse rockshafts mounted on the frames normally aligned with one another, the rockshafts being effective upon movement to adjust the implements vertically; fore-and-aft extending vertically disposed plates adjacent to one another and fixed to the outrigger and inner sections respectively; structure at the forward end of one of said plates forming a vertically disposed pivot inclined rearwardly from its lower end; structure on the forward end of the other of said plates mounting the outrigger section on the pivot, said structures being complementary to one another to permit swinging of the outrigger section about said pivot from a first position in which the rockshafts are generally in transverse alignment upwardly and forwardly to a second position in which the outrigger section is transversely disposed forwardly of the inner section; a pair of rockarms mounted on the adjacent ends of the respective rockshafts; means for connecting said rockarms whereby the rockshafts will operate in unison; means for connecting the rockarm on the outrigger section to the outrigger frame whereby the implements on the outrigger section may be held against vertical adjustment irrespective of movement of the implements on the inner section; attaching means for connecting the inner and outrigger sections to one another for preventing swinging of the outrigger section about the pivot; and means for rocking the rockshaft on the inner section.

4. A cultivator adapted for mounting on a tractor body comprising: an inner section and an outrigger section, the inner section being connected to the side of and extending outwardly from the tractor, the outrigger section being disposed outwardly of and adjacent the inner section, each of the sections having laterally disposed implement carrying frames; transverse rockshafts mounted on the frames normally aligned with one another, the rockshafts being effective upon movement to adjust the implements vertically; structure fixed to and forward of one of said frames forming a vertically disposed pivot inclined rearwardly from its lower end; structure on the other of said frames mounting the outrigger section on the pivot, said structures being complementary to one another to permit swinging of the outrigger section about said pivot from a first position in which the rockshafts are generally in transverse alignment upwardly and forwardly to a second position in which the outrigger section is transversely disposed forwardly of the inner section; attaching means for connecting the inner and outrigger sections to one another for preventing swinging of the outrigger section about the pivot; means for interconnecting the rockshafts whereby one will rock in response to rocking of the other; and means effecting rocking of one of the rockshafts.

5. A farm implement adapted for mounting on a tractor body comprising: an inner section and an outrigger section, the inner section being connected to the side of and extending outwardly from the tractor, the outrigger section being normally disposed outwardly of and adjacent the inner section; structure fixed to and forward of one of said sections forming a vertically disposed pivot inclined rearwardly from its lower end; structure on the other of said sections mounting the outrigger section on the pivot, said structures being complementary to one another to permit swinging of the outrigger section about said pivot from a first position in which the outrigger section is outward of the inner section upwardly and forwardly to a second position in which the outrigger section is forwardly of the inner section; and attaching means for connecting the inner and outrigger sections to one another for preventing swinging of the outrigger section about the pivot.

6. A farm implement comprising: an inner section and an outrigger section, each of the sections having laterally disposed tool carrying frames; transverse rockshafts mounted on the frames normally aligned with one another, the rockshafts being effective upon movement to adjust the tools vertically; structure forming a vertically disposed pivot on one of said frames; structure on the other of said frames mounting the outrigger section on the pivot, said structures being complementary to one another to permit swinging of the outrigger section about said pivot substantially 180° from a first position in which the rockshafts are generally in transverse alignment forwardly to a second position in which the rockshaft of the outrigger section is transversely disposed and is forward of the inner section; a pair of rockarms mounted on the adjacent ends of the respective rockshafts; means for connecting said rockarms whereby the rockshafts will operate in unison; means for connecting the rockarm on the outrigger section to the outrigger frame whereby the tools on the outrigger section may be held against vertical adjustment irrespective of movement of the tools on the inner section; means for detachably connecting the inner and outrigger sections to one another for preventing swinging of the outrigger section about the pivot; and means for rocking the rockshaft on the inner section.

7. A farm implement comprising: an inner section and an outrigger section, each of the sections having laterally disposed tool carrying frames; inner and outer transverse rockshafts mounted on the inner and outrigger frames respectively normally aligned with one another, the rockshafts being effective upon movement to adjust the tools vertically between up and down positions; means effecting rocking motion of the inner rockshaft; structure forming a vertically disposed pivot forward of and on one of said frames; structure on the other of said frames mounting the outrigger section on the pivot, said structures being complementary to one another to permit lateral swinging of the outrigger section about said pivot substantially 180° between a first position in which the sections are in substantially inner and outer relation to one another and the rockshafts are generally in transverse alignment and a second position in which the rockshaft of the outrigger section is transversely disposed forwardly of the inner section; a pair of rockarms mounted on the adjacent ends of the respective rockshafts; means detachably connecting said rockarms whereby the rockshafts will operate in unison; lock means on the outrigger frame for connecting the rockarm on the outrigger section to the outrigger frame whereby the tools on the outrigger section may be held in their up position irrespective of movement of the rockshaft on the inner section; one-way drive means between the rockarms effecting movement of the rockarm on the outrigger section to a position of engagement with the lock means; means for detachably connecting the inner and outrigger sections to one another for preventing swinging of the outrigger section about the pivot; and means for rocking the rockshaft on the inner section.

8. The invention defined in claim 7 in which said one-day drive means is a rigid extension of one of the rockarms which engages the other rockarm and operates to rock the rockshaft on the outrigger section in the direction effecting raising of the tools.

9. The invention defined in claim 7 in which the rockarms are elongated elements lying side by side, the means detachably connecting the rockarms is in the form of a fastener connecting the rockarms, and the lock means on the outrigger frame is in the form of a member also adaptable to mount the fastener for locking the member to the outrigger rockarm thereby effecting the use of the lock means to the exclusion of the means connecting the rockarms or alternately to effect the use of the means connecting the rockarms to the exclusion of the lock means.

10. The invention defined in claim 7 in which the rockarms are elongated elements lying side by side and having registrable apertures therein, the means detachably connecting the rockarms is in the form of a fastener receivable in the aforesaid apertures, and the lock means on the outrigger frame is in the form of an apertured member also adaptable to receive the fastener for locking the member to the outrigger rockarm thereby effecting the use of the lock means to the exclusion of the means connecting the rockarms or alternately to effect the use of the means connecting the rockarms to the exclusion of the lock means.

11. A cultivator attachment for a tractor, comprising a pair of sectionalized frame structures attachable to the tractor to extend laterally outwardly therefrom, each of the frame structures having an inner section attached to the tractor and having an outer section, means connecting the outer section to the inner section and permitting forward and inward swinging of the outer section, each of the sections having thereon vertically movable cultivator-mounting means supported thereon, the inner and outer sections having aligned shafts extending therealong and journalled thereon in end-to-end relation with each other, means affixed to said shafts for vertically moving the cultivator mounting means when the shafts are rotated, control means on the tractor for rotating the shaft on the inner section of the frame structure, one of the shafts having a rigid arm fixed thereto, the other shaft having a rigid arm fixed thereto, said arms disposed in substantially parallel opposed relation when said shafts are in said end-to-end relation, and means carried by one arm interengaging with the other arm when said arms are in said parallel opposed relation to lock the same together for causing said shafts to rotate in unison for controlling the cultivator mounting means on the inner and outer frame sections, and additional means for holding the outer shaft against rotation when the cultivator-mounting means of the outer section are raised and the outer section is swung forwardly.

References Cited in the file of this patent

UNITED STATES PATENTS

| | | |
|---|---|---|
| 1,927,458 | Klise | Sept. 19, 1933 |
| 2,331,730 | Rusco | Oct. 12, 1943 |
| 2,341,146 | Kriegbaum et al. | Feb. 8, 1944 |
| 2,423,148 | Johnson | July 1, 1947 |
| 2,561,078 | Todd | July 17, 1951 |

UNITED STATES PATENT OFFICE
CERTIFICATE OF CORRECTION

Patent No. 3,092,187 June 4, 1963

George D. Hunter et al.

It is hereby certified that error appears in the above numbered patent requiring correction and that the said Letters Patent should read as corrected below.

Column 6, lines 31 and 66, and column 7, line 21, strike out "forwardly", each occurrence, and insert instead -- relative to the tractor body and is forward --; column 6, lines 35 and 36, strike out "means for connecting said rockarms whereby the rockshafts will operate in unison;"; column 8, line 30, for "day" read -- way --.

Signed and sealed this 17th day of December 1963.

(SEAL)
Attest:

ERNEST W. SWIDER
Attesting Officer

EDWIN L. REYNOLDS

Acting Commissioner of Patents